Nov. 30, 1943.     H. FRIEBE     2,335,402
FILM FEED MECHANISM FOR PHOTOGRAPHIC CAMERAS
Filed June 15, 1940     2 Sheets-Sheet 1
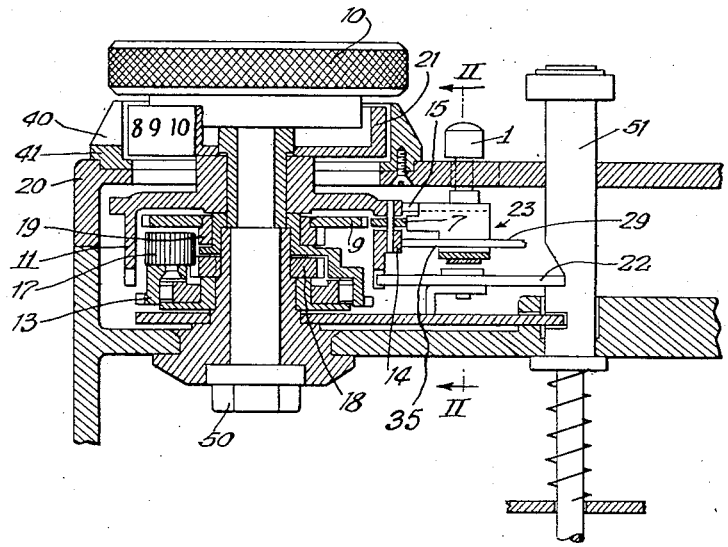
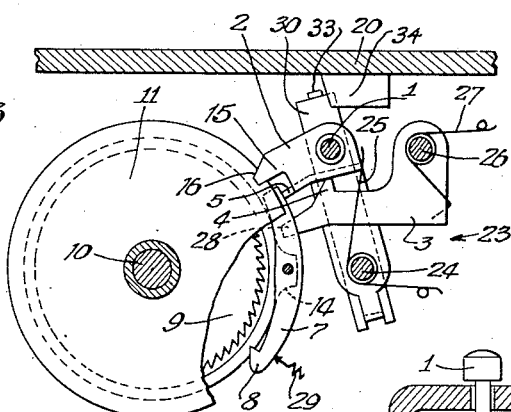
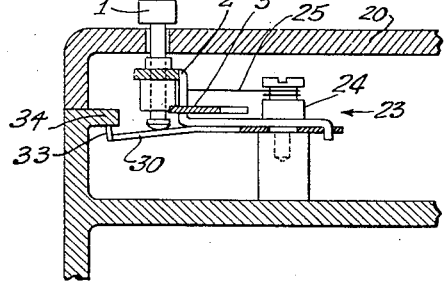
Inventor:
Hermann Friebe Nov. 30, 1943.  H. FRIEBE  2,335,402
FILM FEED MECHANISM FOR PHOTOGRAPHIC CAMERAS
Filed June 15, 1940  2 Sheets-Sheet 2

Inventor:
Hermann Friebe
BY:
Attys.

Patented Nov. 30, 1943

2,335,402

UNITED STATES PATENT OFFICE 2,335,402

FILM FEED MECHANISM FOR PHOTOGRAPHIC CAMERAS

Hermann Friebe, Jena, Germany; vested in the Alien Property Custodian

Application June 15, 1940, Serial No. 340,691
In Germany June 19, 1939

17 Claims. (Cl. 95—31)

The invention relates to improvements in film feed mechanisms for photographic cameras.

An object of the invention is to provide a film feed mechanism which assures the positioning of uniform lengths of film in operative relation to the lens of the camera without necessitating with each exposure a careful inspection of the window usually provided in the back wall of the camera and through which a number is displayed when a film length is in proper position.

Another object of the camera is to provide a film feed mechanism which occupies in the interior of the camera as well as on the exterior thereof a minimum of space, thereby permitting the camera to be extremely compact or permitting other accessories, as for instance, an exposure meter to be fitted into the camera and on the outside thereof in that space which heretofore had been occupied by parts of the film feed mechanism.

The invention also has the object of providing a film feed mechanism which is maintained in operative condition for the withdrawal of uniform lengths of film from a spool solely until the last sensitized section of the film has been used up and to permit subsequently to the last exposure of the sensitized portion of the film the latter to be unwound from its supporting spool and wound up on a take-up spool without compelling the operator to withdraw the film in portions of uniform length from the supporting spool.

It is, furthermore, an object of the invention to provide a film feed mechanism in which the initial removal of a section of the film may be effected without compelling the operator to observe the successive removal of uniform length sections from the film, the commercial film normally being provided with a non-sensitized strip at each end, thereby making it possible for the operator to initiate the withdrawal of uniform lengths of the film from the supporting spool solely when the first sensitized section of the film is in position for making an exposure.

The invention also has the object of providing a film feed mechanism in which the uniform withdrawal of film sections from the supporting spool is effected in a known way by means of a film length control element, but wherein said film length control element is disconnected from operative relation with the film feed actuating member when the last sensitized section of the film has reached exposure position and wherein, furthermore, said film length control element remains disconnected from the film feed actuating mechanism until the first sensitized section of the film subsequently inserted into the camera has reached exposure position.

The invention, furthermore, has the object of providing a film feed mechanism in which the control of the film length sections is rendered effective by the operator through actuation of a readily accessible element on the outside of the camera, which manual element, however, is locked against operation until the film length control is to be rendered inoperative automatically.

The invention, furthermore, has the object of providing a film feed mechanism with a film length control which not only will be disconnected from the film feed actuating mechanism automatically upon the positioning of the last sensitized film section in operative relation, but in which said film length control also is locked against operation in this disconnected condition until manually released.

In order to attain these objects, the invention utilizes a differential mechanism interposed between a film feed actuating member and a film length control element to compensate for the variation in the diameters of the supporting spool and the take-up spool of the film respectively, which fluctuation is due to the various sections of the film being successively unwound from one spool and wound up on another spool. This differential operating mechanism comprising a planetary gearing, however, does not form a part of the present invention.

With the above objects and numerous other objects in view, an embodiment of the invention is illustrated in the accompanying drawings by way of example, and reference is made to these drawings in the following description of the invention.

In the drawings:

Fig. 1 is a longitudinal vertical fragmentary section through a portion of a camera containing the film feed actuating and film feed controlling elements;

Fig. 2 is a fragmentary vertical section on line II—II of Fig. 1 in a plane at right angle to the section of Fig. 1;

Fig. 3 is a top plan view and partly horizontal section through the mechanism for automatically controlling the advance of the film and showing the parts in a position in which the film feed control element is disconnected from the film feed actuating member and locked against operation thereby;

Figure 4:
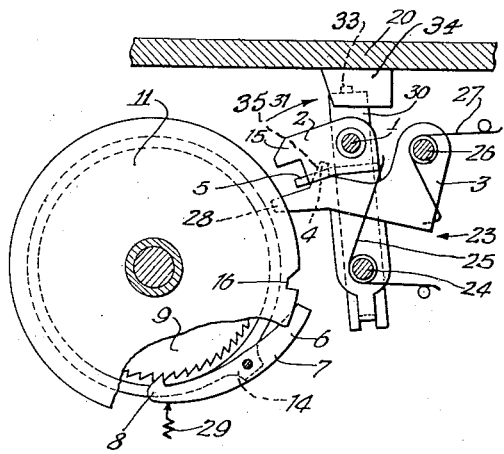
Figure 5:
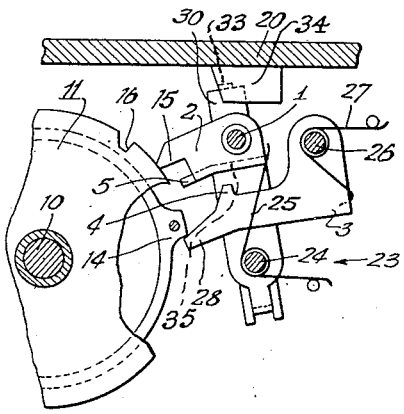

Fig. 4 is a similar partial top plan view and horizontal section showing the same mechanism in a position in which the film feed control element is connected for operation by the film feed actuating member, and Fig. 5 is a similar fragmentary top plan view and horizontal section showing certain parts of the mechanism in position just prior to the disconnection of the film feed control element from the film feed actuating member.

Figure 6:
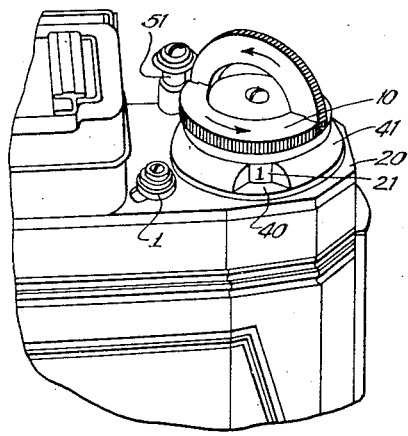

Fig. 6 is a fragmentary perspective view of a camera which employs the film feed actuating and film feed controlling elements shown in Figs. 1–5.

The film feed actuating member in the form of a rotary button 10 advisably is provided at the top or at some other suitable position of the camera housing 20. A film counter in the form of a disc 21 in axial alinement with the film feed actuating button 10 carries on a flange the numerals which indicate the numerical sequence of the exposures made or to be made. These numerals may be read through a gap 40 in the ring 41 fixedly mounted on the camera housing 20 and surrounding the flange of the disc 21. A film length control element in the form of a drum 11 also is in axial alinement with the film feed actuating button 10 and is coupled with the film counter disc 21.

As in other cameras the take-up spool of the film (not shown) is gripped by a clutch member 50, which is rotated upon rotation of the film feed button 10, to pull off the film from a companion spool (not shown). Since in this operation a gradual variation of the spool diameters is induced it becomes essential to provide a film length control element assuring the positioning of film portions of uniform length with respect to the lens of the camera.

The operative connection between the film feed actuating member 10, the film length control element 11 and film counter 21, which last named elements also are operatively connected with each other, is effected by the planetary gearing diagrammatically indicated at 17, 18 and 19.

Upon operation of the film feed actuating button 10, a carrier 13 of a planetary pinion 17 is moved to rotate or revolve said pinion in engagement with a gear 18 and also in engagement with another gear 19 which is fixedly connected with a ratchet 9. The planetary gearing does not form part of the present invention. It is one of the instrumentalities for causing—by means of a ratchet mechanism or in some other way—the film spool clutch 50 to be rotated a sufficient number of times to place in successive operations uniform lengths of film in operative position. The feed control drum may be provided with a plurality of notches (not shown) for actuating a holding pawl (not shown) after predetermined rotary movement. This pawl upon actuation will engage the pinion carrier 13 to stop the same. This mechanism, therefore, will lock the button 10 against movement after a film portion of proper length has been placed in operative position.

A shutter trip button is indicated at 51, and as in other cameras means may be provided for preventing the shutter from being actuated unless a new length of film has been fed to operative position and for preventing the film feed from being operated unless the shutter trip button has been released. These elements for mutually guarding shutter release and film feed also are known from other cameras and do not form part of the present invention.

This planetary gear and ratchet mechanism and the locking mechanisms of the film feed button are similar to other constructions serving the same purpose and for this reason are not explained in detail in the present specification.

As shown in Figs. 3 to 5, the film feed control drum 11 is provided with a circumferential projection 14 wherein a pawl 7 is pivotally mounted intermediate its ends. The pawl is under control of a spring 29 diagrammatically indicated only, which has a tendency for normally holding the nose 8 of the pawl in engagement with the teeth of the ratchet disc 9. This disc is supported for rotary movement in the interior of the film length control drum 11. The pawl 7, therefore, normally connects the ratchet 9 and the control drum for rotation with each other.

The pawl 7 pivotally supported on the feed control drum projects outwardly from the drum at its tail end 6 as long as the nose 8 operatively connects the ratchet 9 with the drum 11.

The release of the film length control element 11 from the film feed actuating member 10 is effected by a mechanism indicated at 23 and adapted to disconnect the drum 11 from the ratchet 9.

This mechanism comprises a lever 2 which is pivoted about a pin 24 fixedly secured in the housing 20 adjacent the drum 11. A spring 25 acting on the lever normally has a tendency to urge said lever counter-clockwise, as shown in Figs. 3 to 5 in direction towards the drum. This mechanism also comprises a lever 3 pivotally mounted adjacent drum 11 about the fixed pin 26 and normally under control of a spring 27 which has a tendency to urge the lever 3 clockwise, Figs. 3 to 5. The lever 3 is provided with a lateral projection 4 adapted to engage the other lever 2 and to urge the same clockwise about the pivot 24 against the action of the lever spring 25. The withdrawal of the lever 3 from holding engagement with the lever 2 is effected by the circumferential projection 14 of the film lenth control drum 11 striking a nose 28 on said lever 3, as shown in Fig. 5.

Lever 2 is provided with a finger 5 adapted to engage the tail end 6 of pawl 7 when the nose 28 of lever 3 is struck by projection 14 to withdraw from operative position with respect to the secondary lever 2. The finger 5 of the lever 2 forces the front portion 8 of said pawl out of engagement with the ratchet 9 and thereby interrupts the operative connection between the planetary gearing and the film length control drum 11. Additionally, the lever 2 also is provided with a nose 15 which by the rocking movement of the lever about the pivot 24 enters a notch 16 in the circumference of the control drum 11 whereby the latter is locked against further rotation.

As shown in Fig. 2, a leaf spring 30 is secured to the lower face of the first named lever 2 and is likewise pivoted on the pin 24. The leaf spring is flexed to engage by means of a hook 33 a projection 34 on the camera housing 20 when the parts are in operative position shown in Fig. 4. When, however, owing to the engagement of the nose 28 of lever 3 by the projection 14 of the drum 11, Fig. 5, the lever 3 is removed from its constraining position with respect to the lever 2, and the lever 2 then is forced under the influence of the spring 25 into the position shown in Fig. 3, the spring 30 connected with the lever 2 is moved from beneath the projection 34 of the camera casing and any return movement of the lever 2 to the position shown in Fig. 4 is rendered impossible until the spring 30 is manually returned to the position shown in Fig. 4. For the purpose of effecting this return of lever 2 to its original position, the spring 30, therefore, is under control of a short pin 35 fixed to lever 2 and projecting through an enlarged slot in the top of the camera housing, and carrying at the top of the housing the actuating button 1. By depressing this button 1 and then shifting the assembly of the lever 2 and spring 30 clockwise about the pivot 24, the nose 33 of the spring and hence also lever 2 will be frictionally held by the lug 34 of the camera housing 20. The parts are then restored to that operative position which is shown in Fig. 4 and in which position the pawl 7 under control of its spring 29 is returned to engagement with the ratchet 9.

The operation is as follows:

The ordinary film is composed of a sensitized portion and non-sensitized strips, usually paper at each end. After the last one of the image sections on the sensitized portion of the film has been exposed and the film feed button 10 is operated, it also imparts again a part rotation to the film length control drum 11. The circumferential projection 14 of the drum now strikes the nose 28 of the lever 3, rocking said lever counterclockwise against the action of its spring 27 and moving the lever 3 away from the first named lever 2, Fig. 5. The spring 25 then urges said lever 2 forwardly until the nose 15 rides into engagement with the circumference of the drum 11, while at the same time the finger 5 of the lever 2 acts upon the tail 6 of the pawl 7 to rock this pawl out of engagement with the ratchet 9. In the continued part rotation of the drum 11, the notch 16 on the circumference of the drum receives the nose 15 of the lever 2, whereby the drum is positively locked against further rotation.

The film feed actuating button 10 may now be rotated freely to continue the winding-up operation of the film, namely the non-sensitized strip, on the wind-up spool without in any way influencing the feed drum 11 which remains in its position.

This position in which the feed drum coinciding with the completion of the last exposure remains locked now also may be retained for the insertion of the next film into the camera. The film may be introduced in the ordinary way by placing the spools in position and then unwinding the paper leader, namely the non-sensitized part of the film, until an indication appears in the windows of the rear wall of the camera to show that the first sensitized portion of the film is in exposure position. Where the film is to be positioned in a camera while the rear wall is removed, the initial unwinding of the film on the empty take-up spool may take place until a mark on the paper leader coincides with a mark provided for this purpose on the camera, whereupon the rear wall again is closed and camera and film are ready for the first exposure.

When it is then desired to make the first exposure, the differential operative relation between the film feed actuating member 10 and the film feed control element 11 is reestablished by laterally displacing the small button 1 while it is being slightly depressed against the force of leaf spring 30; the button 1 thereby brings the lever 2 from the position shown in Fig. 3 to the position shown in Fig. 4, in which position the leaf spring 30 frictionally maintains in engagement with lug 34 on the camera wall. The movement of the release button 1 from locking position to release position is a very short movement in direction of arrow 31, Fig. 4. During this return movement of the lever 2, the lateral projection 4 on the lever 3 is held against the lever 2 by spring 27, and the finger 4 reaches a cut-out portion 35, Fig. 1, in the vertical wall of lever 2 whereupon this finger 4 under the influence of the spring 27 is moved to the position shown in Fig. 4, so that lever 3 also serves for holding locking lever 2 in release position. Springs 29 acting on the nose 8 of the pawl 7 in the meantime has forced this pawl again to operative position, Fig. 4.

In this position the film feed actuating button 10 is again coupled for differential operation through the planetary gearing and the ratchet 9 with the film feed control element 11, and this differential operative relation will again be automatically interrupted when the film length control element reaches the position shown in Fig. 5. This occurs after a single complete revolution of the film feed control element.

It is obvious that various modifications of the details shown in the present application may be made within the spirit of the invention. It may for instance be modified to effect the release of lever 3 from holding engagement with lever 2 after the film feed control drum 11 has made more or less than one complete revolution. The lever 3 might in that case be controlled by a cam on the drum to be moved vertically into the plane of the projection 14. Another modification which could readily be applied would be to retain lever 2 in operative position, Fig. 4, by some device different from the leaf spring 30. For instance, the lever 2 might be moved into a suitable frictional notch of the camera casing where it could be frictionally retained.

While in the present embodiment the projection 14 is shown as a circumferential projection and the locking notch 16 also is on the circumference of the feed control drum 11, it is obvious that these elements might be provided on the top of the drum 11 which would obviously lead to a modification of the position of the levers 2 and 3.

I claim:

1. In a film feeding mechanism for photographic cameras, the combination of a film feed button, a film measuring drum, a film spool clutch, said button, drum and clutch being rotatable about the same axis, planetary gearing operable by said button and connected with said film measuring drum and said film spool clutch for differentially rotating said clutch and drum respectively, and a mechanism under control of the drum for disconnecting the drum from the button when the drum has been rotated through a predetermined angle of rotation and locking the drum against rotation, whereby subsequently to the disconnection of the drum, the spool clutch can be rotated directly by the button.

2. In a film feeding mechanism for photographic cameras, the combination of a film feed button, a film measuring drum, an exposure counter, said button, drum and counter being rotatable about the same axis, a film spool clutch, planetary gearing operable by said button and interposed between said film measuring drum and said film spool clutch for differentially rotating said clutch drum, respectively, and a mechanism under control of the drum for successively disconnecting the drum from the planetary gearing when the drum has been rotated through a predetermined angle of rotation and locking said drum against rotation, whereby subsequently to the disconnection of the drum the spool clutch can be rotated directly by the button.

3. In a film feeding mechanism for photographic cameras, the combination of a film feed button, a film measuring drum, an exposure counter, a film spool clutch, said button, drum, exposure counter and film spool clutch being rotatable about the same axis, planetary gearing operable by said button and interposed between said film measuring drum and said film spool clutch for differentially rotating said clutch and drum respectively, a normally inoperative lever mechanism for disconnecting the drum from the button and means under control of the drum for releasing said machanism to operation when the drum has been rotated through a predetermined angle of rotation, whereby subsequently to the disconnection of the drum, the spool clutch can be rotated directly by the button.

4. In a film feeding mechanism for photographic cameras, the combination of a film feed actuating member, a film length control element, an exposure counter, said member, element and counter being in axial alinement and said element and counter being fixedly connected to each other, a film spool clutch, means operable intermittently by the film feed actuating member and interposed between said control element and said film spool clutch for differentially driving said clutch when the film length control element is intermittently moved by said film feed actuating member, and means under control of said film length control element for disconnecting it from said film feed actuating member and for locking it and the counter against rotation when said control element has completed a predetermined number of operative movements, to permit thereafter the film spool clutch to be driven by the film feed actuating member independently of said film length control element.

5. In a film feeding mechanism for photographic cameras, the combination of a film feed actuating member, a film length control element, a spool clutch, means operable by said feed actuating member and connected with said film length control element and said clutch for successively differentially rotating the clutch while the film length control element is successively rotatably moved to feed uniform lengths of film, and means under control of said element for disconnecting the same from said feed actuating member and for positively locking it when said control element has traveled through a predetermined length of its path while said feed actuating member and clutch remain movable independently of the control element.

6. In a film feeding mechanism for photographic cameras, the combination of a film feed actuating member, a film length control element, a spool clutch, means operable intermittently by the film feed actuating member and connected with said film feed control element and said film spool clutch for rotating said clutch differentially when the film length control element is imparted rotary movement by said film feed actuating member, and means under control of the film length control element for disconnecting the same from said film feed actuating member and locking it against rotation when said film length control element has completed one revolution, to permit thereafter the film spool clutch to be rotated by the film feed actuating member independently of said film length control element.

7. In a film feeding mechanism for photographic cameras, the combination of a film feed actuating member, a film length control element, a spool clutch, a ratchet, said clutch and ratchet being operable by the feed actuating member, a pawl carried by said film length control element, means for operatively connecting said pawl and ratchet means normally inoperative, but operative under control of said film control element for disconecting the pawl from said ratchet and for locking said feed control element against movement when said control element has traveled through a predetermined length of its path, and manual means for releasing the film control element from said locking means and restoring said pawl disconnecting means to inoperative position.

8. In a film feeding mechanism for photographic cameras the combination of a film feed actuating member, a film length control element, a counter fixed to said film length control element, a spool clutch, means operable by said feed actuating member and connected with said film length control element and said clutch for successively differentially rotating the clutch and film length control element respectively to feed successively uniform lengths of film, means under control of said film length control element for automatically disconnecting it from said feed actuating member and locking it against rotation when said control element and counter have traveled through a predetermined length of their path, manual means for releasing said locking means from said film length control element and counter, and means for simultaneously reestablishing connection between said film length control element counter and said feed actuating member, whereby prior to the release of the locking means, the spool clutch is operable directly by the film feed actuating member for initially unwinding a portion of a new spool of film without actuating the counter, and is operable for completing the final winding up of a spool, without actuating the counter after the locking has become effective.

9. In a film feeding mechanism for photographic cameras, the combination of a film feed actuating member, a film length control element, a spool clutch, means operable by said film feed actuating member and connected with said film length control element and said clutch for successively differentially rotating the clutch and the film length control element respectively to feed successively uniform lengths of film, said means including a ratchet operable by the feed actuating member and a pawl mounted on the film length control element and normally urged into engagement with said ratchet whereby said ratchet and said film length control element are operatively connected, and means actuated by the film length control element for releasing said pawl from said ratchet to permit actuation of said ratchet independently of said film length control element and for locking said control element against rotation.

10. In a film feeding mechanism for photographic cameras, the combination of a film feed actuating member, a film length control element, a spool clutch, means operable by said film feed actuating member and connected with said film length control element and said clutch for successively differentially rotating the clutch and the film length control element respectively to feed successively uniform lengths of film, said means including a ratchet, a pawl normally in engagement with said ratchet, a projection on the film length control element on which said pawl is pivotally mounted, manually releasable means for locking the film length control element against movement, and means spaced a certain distance from said locking means and operable by said projection for moving the pawl out of engagement with said ratchet to render said first named differential means inoperative after the film length control element has traveled a predetermined distance.

11. In a film feeding mechanism for photographic cameras, the combination of a film feed actuating member, a film length control element, a spool clutch, said film feed actuating member, film length control element and spool clutch being in axial alinement, an exposure counter coupled with said film length control element and in axial alinement therewith, means operable by said film feed actuating member and connected with said film control element and said clutch for differentially rotating the clutch and the film length control element and exposure counter respectively to feed successively uniform lengths of film, said means including a ratchet and a pawl mounted on the film length control element and normally constrained for engagement with the teeth of the ratchet, means actuated by the film length control element for shifting said pawl out of engagement with said ratchet when said film length control element has traveled through a predetermined length of its path and for locking said film length control element against differential rotation by said film feed actuating member, and manually operated means for moving said locking and pawl shifting means to release position with respect to said film feed control element and pawl respectively.

12. In a film feed mechanism for photographic cameras, the combination of a film feed actuating member, a film length control element, a spool clutch, an exposure counter, said film feed actuating member, film length control element, spool clutch and exposure counter being in axial alinement, means operable by said feed actuating member and connected with said film length control element and said clutch for differentially rotating the clutch and the film length control element respectively to feed successively uniform lengths of film, and means under control of said film length control element for disconnecting it from said first named clutch rotating means and for locking it against further actuation, said means comprising a first lever engaged by said film length control element when the same has traveled through a predetermined length of its path, and a second lever normally held from movement by said first lever, until the latter is engaged by said element, said second lever being adapted to successively disconnect and lock said element against further movement, manually operable means for restoring said second lever to release position with respect to said element, means for restoring said first lever to its initial position upon return of said second lever to its release position, and means for locking said second lever in locking position until the manual release means are actuated.

13. In a film feeding mechanism for photographic cameras, the combination of a film feed actuating member, a film length control element, a spool clutch, means operable by said film feed actuating member and connected with said film length control element and said clutch for differentially rotating the clutch the film length control element respectively to feed successively uniform lengths of film, means under control of said film length control element for disconnecting it from said first named means when said control element has traveled through a predetermined length of its path, and for locking said control element subsequently against further rotation, manually operated means for releasing said locking means, automatic means for restoring the connection between said first named means and the film length control element, and means for locking said manually operable release means in inoperative position on the camera.

14. In a film feed mechanism for photographic cameras, the combination of a film feed actuating member, a film length control element, a spool clutch, means operable by said film feed actuating member and connected with said film length control element and with said clutch for differentially rotating the clutch and the film length control element respectively to feed successively uniform lengths of film, means under control of said film length control element for disconnecting it from said first named differential means when said control element has traveled through a predetermined length of its path and for subsequently locking it against further rotation, said last named means comprising a first lever actuatable by said film control element, a second lever normally held against movement by said first named lever, means for moving said second lever upon actuation of said first lever into locking engagement with said film length control element, manually operable means connected with said second lever for moving the same to release position with respect to the film length control element, means for moving the first lever to holding position with respect to the second lever when the latter has been moved to release position with respect to the film length control element, and means on the camera cooperating with said manually operable release means for frictionally holding said means in release position.

15. In a film feeding mechanism for photographic cameras, the combination of a rotary film feed actuating button, a rotary film length control drum, a spool clutch, an exposure counter coupled with said drum, said button, drum, counter and clutch being arranged in axial alinement, planetary gearing operable by the film feed button and connected with the clutch and drum for successively differentially rotating the clutch while the drum is successively rotatably moved uniformly to effect successively the feed of uniform lengths of film, the planetary gearing including a ratchet operable by the button and a pawl adapted for engagement with the ratchet and pivotally mounted on the drum, a pair of levers pivotally mounted in the camera adjacent the drum and adapted to engage said pawl and the drum respectively, means on the drum for actuating one of said levers when the drum has traveled through a predetermined path, said lever being normally in holding engagement with the other lever and being adapted to be moved out of said holding engagement by said drum, means acting on the other of said levers for rocking the same in direction towards the drum when released by said first named lever, the second named lever upon being rocked towards the drum being adapted first to engage the pawl to disconnect it from the ratchet, and to subsequently lock the drum against further rotation, and means manually operable from the exterior of the camera on said second lever for releasing it from locking engagement with the drum and restoring it to initial position, means acting on the first named lever for restoring it to holding engagement with said second lever when the latter has been restored to drum release position, and means acting on said manually operable means of the second lever for retaining said means in predetermined position.

16. In a film feeding mechanism for photographic cameras, the combination of a film feed actuating button, a film length control drum, an exposure counter coupled with said drum, a spool clutch, said button, drum, counter and clutch being in axial alinement, a planetary gearing operable by said button and connected with said drum and clutch for successively differentially rotating the clutch while the drum is successively rotatably moved uniformly to successively feed uniform lengths of film, the planetary gearing including a ratchet normally uniformly operable thereby, the drum being provided with a circumferential projection, a spring controlled pawl pivotally mounted on said projection and normally constrained by its spring into engagement with said ratchet, a pair of spring controlled levers pivotally mounted adjacent said drum in the camera, one of said levers projecting into the path of said projection of the drum for movement thereby, said lever normally being constrained by its spring to urge the second lever into a predetermined position remote from the drum, said second lever upon movement of the first lever induced by said projection being adapted to be rocked under the action of its spring in direction towards said drum, said second lever having a finger adapted for engagement with the pawl for rocking said pawl about its pivot to ratchet release position, the drum being provided with a notch circumferentially spaced from the lever engaged end of the pawl, said second lever having a nose adapted for sliding movement on the circumference of the drum and for locking entry into said notch under the influence of its spring, manually operable means connected with said second lever for moving said second lever to release position with respect to said pawl and notch, and means for frictionally retaining said second lever in its release position, said frictional retaining means comprising an element fixed on the camera and said first named spring controlled lever.

17. In a film feed mechanism for photographic cameras, the combination of a film feed actuating button, a film length control drum, a spool clutch, an exposure counter coupled with said drum, said film feed button, drum and exposure counter being mounted in axial alinement, a planetary gearing operable by said button and connected with said drum and said clutch for successively differentially rotating the clutch while the drum and counter successively are rotatably moved uniformly to feed and count respectively uniform lengths of film, the drum having a circumferential projection and means under control of the drum for disconnecting it from said planetary gearing when it has completed one revolution, the planetary gearing including a ratchet, a pawl pivotally mounted intermediate its ends on the projection, a spring for normally urging one end of the pawl into engagement with said ratchet, a pair of levers pivotally mounted adjacent the drum, springs acting on said levers, one of said levers under the action of its spring normally constraining the other lever in a predetermined direction, the first named lever extending into the path of the projection on the drum to be moved thereby from its constraining position when the drum completes one revolution, the other lever under the action of its spring engaging the opposite end of the pawl to disengage the pawl from the ratchet, said other lever having a nose, the drum being provided with a locking notch on its circumference into which said nose enters under the action of the spring of said lever, a leaf spring connected with said other lever, a button accessible from the exterior of the camera and connected with said second lever and leaf spring and manually operable for rocking said second lever in opposition to the direction in which it is constrained by its spring, and means on the camera engaging the leaf spring on the said other lever for holding said leaf spring frictionally in a position in which said other lever is spaced from said drum.

HERMANN FRIEBE.